(12) United States Patent
Storrie et al.

(10) Patent No.: US 8,782,248 B2
(45) Date of Patent: Jul. 15, 2014

(54) WEB SERVICES INTERFACE

(75) Inventors: John Storrie, Maidenhead (GB); William Hern, Reading (GB); Anthony Waters, Maidenhead (GB)

(73) Assignee: Rockstar Bidco, LP, Plano, TX (US)

( * ) Notice: Subject to any disclaimer, the term of this patent is extended or adjusted under 35 U.S.C. 154(b) by 1727 days.

(21) Appl. No.: 11/536,139

(22) Filed: Sep. 28, 2006

(65) Prior Publication Data

US 2008/0080478 A1    Apr. 3, 2008

(51) Int. Cl.
*G06F 15/16* (2006.01)

(52) U.S. Cl.
USPC ............ 709/227; 709/237; 709/228; 709/230

(58) Field of Classification Search
USPC .................................. 709/230; 370/352–353
See application file for complete search history.

(56) References Cited

U.S. PATENT DOCUMENTS

| | | | |
|---|---|---|---|
| 2004/0068584 A1* | 4/2004 | Costa-Requena et al. | 709/246 |
| 2004/0267645 A1* | 12/2004 | Pollari | 705/34 |
| 2006/0114932 A1* | 6/2006 | Cai et al. | 370/466 |
| 2007/0027975 A1* | 2/2007 | Tai et al. | 709/223 |

* cited by examiner

*Primary Examiner* — Saleh Najjar
*Assistant Examiner* — Feliciano Mejia
(74) *Attorney, Agent, or Firm* — Barnes & Thornburg LLP

(57) ABSTRACT

A Call Session Control Function (CSCF) entity in an IP Multimedia Subsystem (IMS) network comprises a first interface for interfacing with other entities and uses signalling in an Extensible Markup Language (XML) format. The other entities that the CSCF interfaces with can be located outside the IMS network, such as servers supporting third party IT or web-based applications, or within the IMS network. The CSCF directs XML based service requests by filtering XML messages received via the first interface.

18 Claims, 10 Drawing Sheets

WEB SERVICES INTERFACE

FIELD OF THE INVENTION

This invention relates to an IP Multimedia Subsystem (IMS) communications network and to implementing applications, such as web services, within such a network.

BACKGROUND TO THE INVENTION

The IP Multimedia Subsystem (IMS) is a Next Generation Networking (NGN) architecture for telecom operators, standardised by the Third Generation Partnership Project (3GPP), which can provide multimedia services to mobile and fixed terminals. IMS uses SIP (Session Initiation Protocol) based signalling and Internet Protocol (IP) connectivity.

A number of CSCF (Call Session Control Function) entities are used to establish a session within the IMS network and process SIP signalling packets. The CSCF entities are the Proxy-CSCF (P-CSCF), Interrogating-CSCF (I-CSCF) and Serving-CSCF (S-CSCF). FIG. 1 shows part of an IMS network which includes the S-CSCF. The S-CSCF is responsible for handling registration processes, making routing decisions and maintaining session states.

Application servers (AS) within an IMS network can host and execute applications which provide services. An Application Server interfaces with the S-CSCF via an IMS Service Control (ISC) interface which uses SIP signalling. Services can include call related services such as Call waiting, Call holding, Call forwarding, Call transfer, Call blocking services. Applications can also provide services such as notifying a user of particular information, such as stock prices or football results. Applications can be provided by the operator of the IMS network, with the application being hosted and executed by a SIP Application Server within the IMS network.

Alternatively, an application can be provided by a third party service provider external to the IMS network, as shown in FIG. 1. An Application Server 30 within the IMS network, called an Open Service Architecture Service Capability Server (OSA SCS), can provide IMS network resources to implement the external service. The S-CSCF communicates with the OSA-SCS over an IMS Service Control (ISM), SIP-based, signalling interface 24. An OSA gateway 14 acts as an intermediary between the OSA SCS 30 and an Application 42 in the IT environment 40. Alternatively, the OSA gateway 14 can interface directly with the S-CSCF 22. An Application can interface directly with the OSA Gateway 14 via an OSA Application Programming Interface (OSA API), which typically uses Parlay over CORBA. Application 41 interfaces with OSA Gateway 14 in this manner. For Applications which use XML, a Parlay-X interface is used and a Parlay-X gateway 16 is required. Application 42 uses a Parlay-X interface to communicate with the Parlay-X gateway 16. The Parlay-X gateway uses a Parlay interface to communicate with the OSA gateway 14. IT-based applications or web-based services typically exchange data in an XML format, and so the arrangement of gateways shown in FIG. 1 is usually required. It can be seen that, with the current architecture, two gateway elements are required whenever an application 42 which uses an XML-based messaging format is connected to the IMS network. This considerably increases the complexity of implementing applications provided by third parties.

The present invention seeks to provide an alternative way of implementing applications in an IMS network.

SUMMARY OF THE INVENTION

A first aspect of the present invention provides a Call Session Control Function (CSCF) entity for use in an IP Multimedia Subsystem (IMS) network, the Call Session Control Function (CSCF) entity comprising:
a first interface for interfacing with other entities, wherein the first interface is arranged to use signalling in an Extensible Markup Language (XML) format.

The world of IT applications use web services as their interface and as such they are based upon XML signalling. Providing an XML interface on the CSCF, which can directly communicate with IT applications, avoids the need to use an OSA/Parlay-X gateway to interface with such applications. This can considerably simplify the provision of applications provided by third parties.

The other entities that the CSCF interfaces with can be located outside the IMS network 20, such as servers supporting third party IT or web-based applications. The provision of an XML based interface on the CSCF also has advantages in communicating with other network entities which are located within the IMS network 20, such as other Application Servers, other CSCF entities, endpoints, network databases such as a Home Subscriber Server (HSS), or parts of the billing system such as a Charging Collection Function (CCF).

Preferably, the CSCF according to the present invention can direct XML based service requests by filtering XML messages received via the first interface. The IMS network can use inspection techniques at the XML level to provide the necessary complex service routing and logic handling. A further advantage of the present invention is that the IMS network can host a new entity—an XML application server. The CSCF acts as an anchor point for persistent session capability for the applications.

XML is a self-describing protocol and new network features can be defined via the XML format. Supporting XML at the Call Session Control Function, which is the primary entity within the IMS network for any session, allows extensive new features to be added to the network with greater ease than is currently possible.

Preferably, the transport layer of signalling between the CSCF and other entities (especially any external entity) is secured, such as by using the Transport Layer Security mechanism of IMS or the HTTPS protocol, and the content of the signalling messages can be encrypted using various standards based security components such as WS-Security or X.509.

The term Call Session Control Function (CSCF) is intended to refer to any of: a Proxy-CSCF (P-CSCF), an Interrogating-CSCF (I-CSCF) and a Serving-CSCF (S-CSCF). These will be generally referred to as x-CSCF.

The functionality described here can be implemented in software, hardware or a combination of these. The invention can be implemented by means of hardware comprising several distinct elements, and by means of a suitably programmed computer. Accordingly, another aspect of the invention provides software for implementing the method.

The software may be stored on an electronic memory device, hard disk, optical disk or other machine-readable storage medium. The software may be delivered as a computer program product on a machine-readable carrier or it may be downloaded to the Call Session Control Function via a network connection.

BRIEF DESCRIPTION OF THE DRAWINGS

Embodiments of the invention will be described, by way of example only, with reference to the accompanying drawings in which.

DESCRIPTION OF PREFERRED EMBODIMENTS

Figure 1:
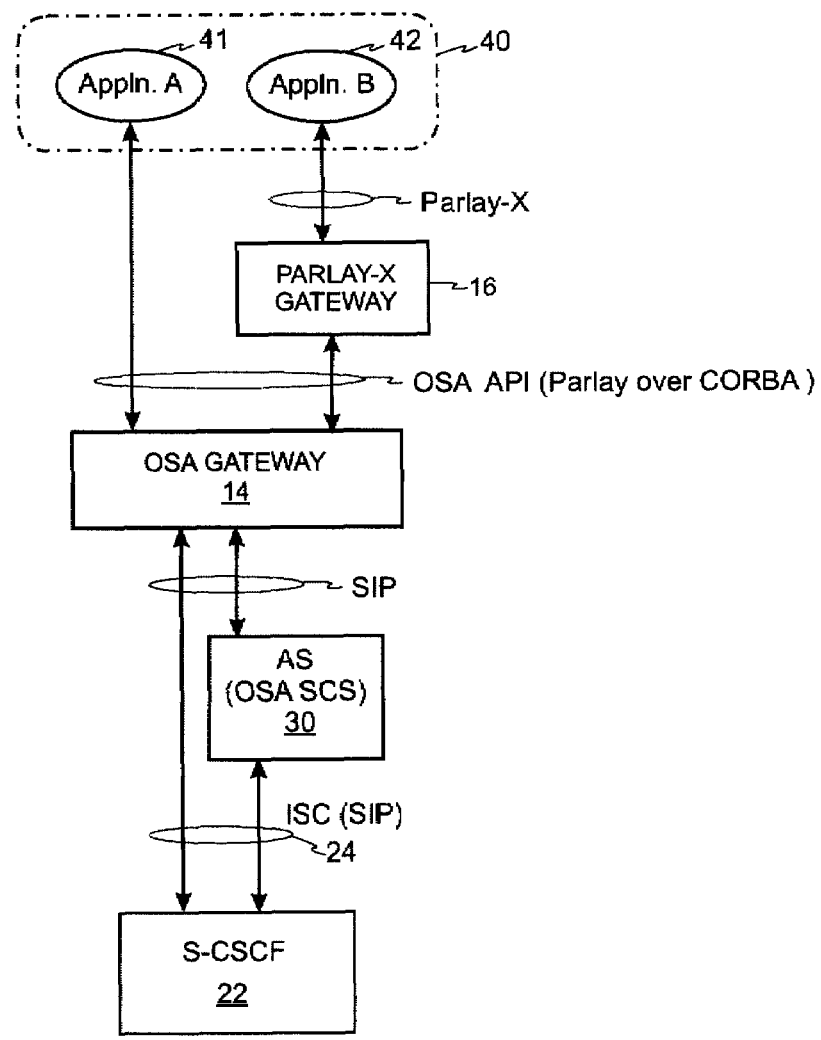
FIG. 1 shows part of a conventional IMS network which supports applications provided by external parties using an OSA gateway.

FIG. 1 shows the provision of services within an IMS network 20 in accordance with an embodiment of the present invention. For clarity, only those parts of the IMS network 20 relevant to the present invention are shown in detail. In this example embodiment it is assumed that a service is provided to a call session involving a user equipment (UE) 12 which accesses the IMS network via an access network 10. Although not shown in detail, access network 10 will typically comprise a Radio Access Node (RAN) supporting a wireless connection with the user equipment 12, and a connection will be established with the IMS network 20 via a Serving GPRS Support Node (SGSN) and a Gateway GPRS Support Node (GGSN). An IMS session will involve a Proxy-Call Session Control Function (P-CSCF) and an Interrogating Call Session Control Function (I-CSCF), both shown generally as part 21 of the IMS network 20, and a Serving-Call Session Control Function (S-CSCF) 22. All of these features are well known. The Serving-Call Session Control Function (S-CSCF) 22 communicates with Application Servers (AS) 28, 30 via an IMS Service Control (ISC) interface 24 which uses SIP-based signalling. Application Server 28 is a SIP-based Application Server within the IMS network. Application Server 30 is an Open Service Architecture Service Capability Server (OSA SCS) which provides IMS network resources to implement an IT Application 42 which is hosted by a server outside 40 the IMS network 20.

Figure 2:
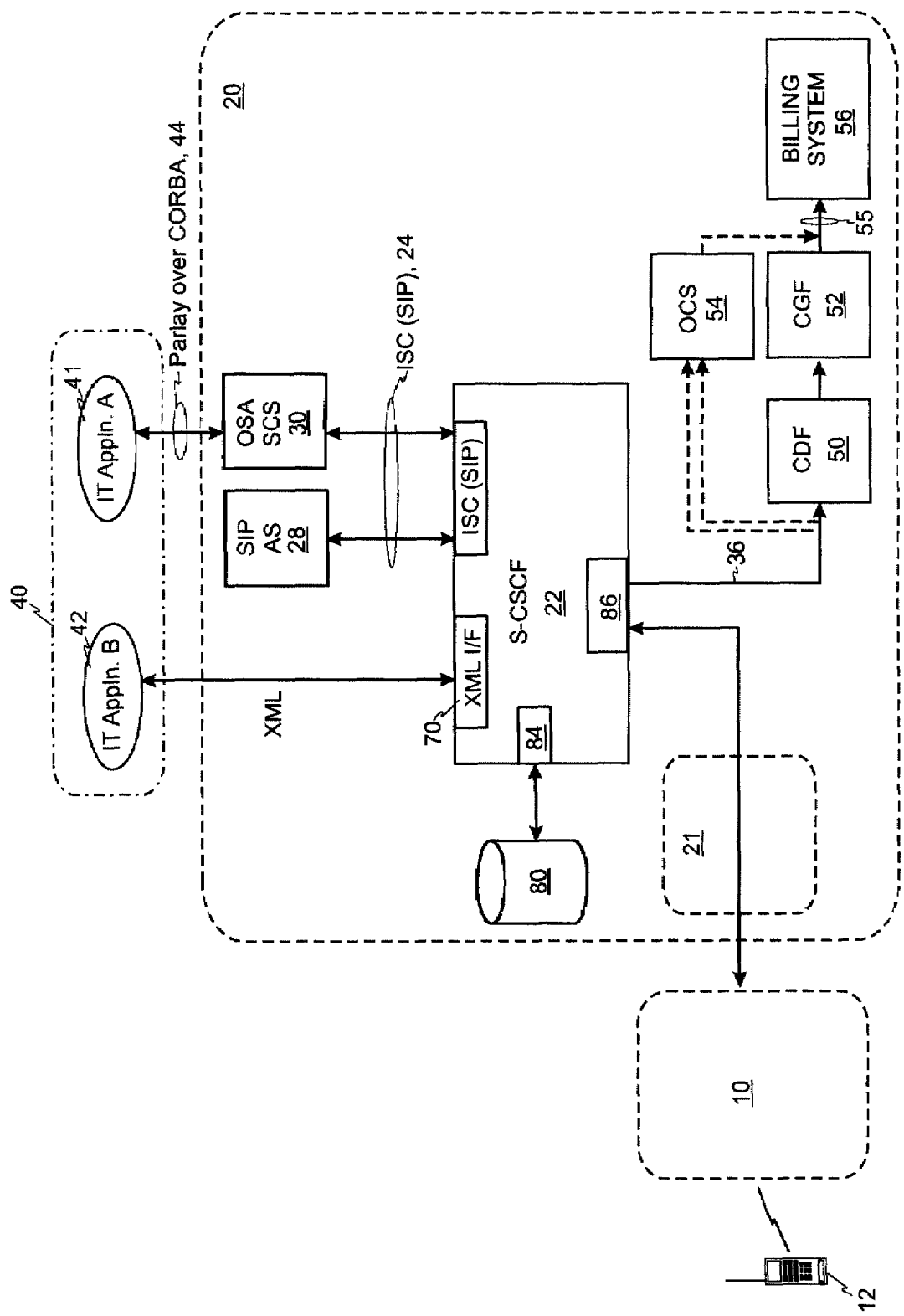
FIG. 2 shows an IMS network according to an embodiment of the present invention.

In accordance with this invention, the S-CSCF 22 also has an XML-based signalling interface 70 which allows the S-CSCF 22 to communicate directly with network entities which use XML-based signalling. The network entities can be other entities within the IMS network 20, such as Application Servers, other x-CSCF entities or endpoints. Alternatively, the other entities can be outside the IMS network 20, such as the Application Server supporting IT Application A 42, as shown in FIG. 2. The provision of interface 70 allows the S-CSCF to directly control the provision of a service, without the need to use an OSA/Parlay gateway 30. It is preferred that the S-CSCF 22 has both the XML interface 70 and the ISC (SIP-based) interface 24 and selectively uses the interfaces as necessary. This allows the S-CSCF to perform SIP and XML namespace based access from the same network point.

The XML signalling interface can be used to interface with applications, as shown in FIG. 2, or to interface with any other network entity that uses an XML format for signalling messages.

Figure 3:
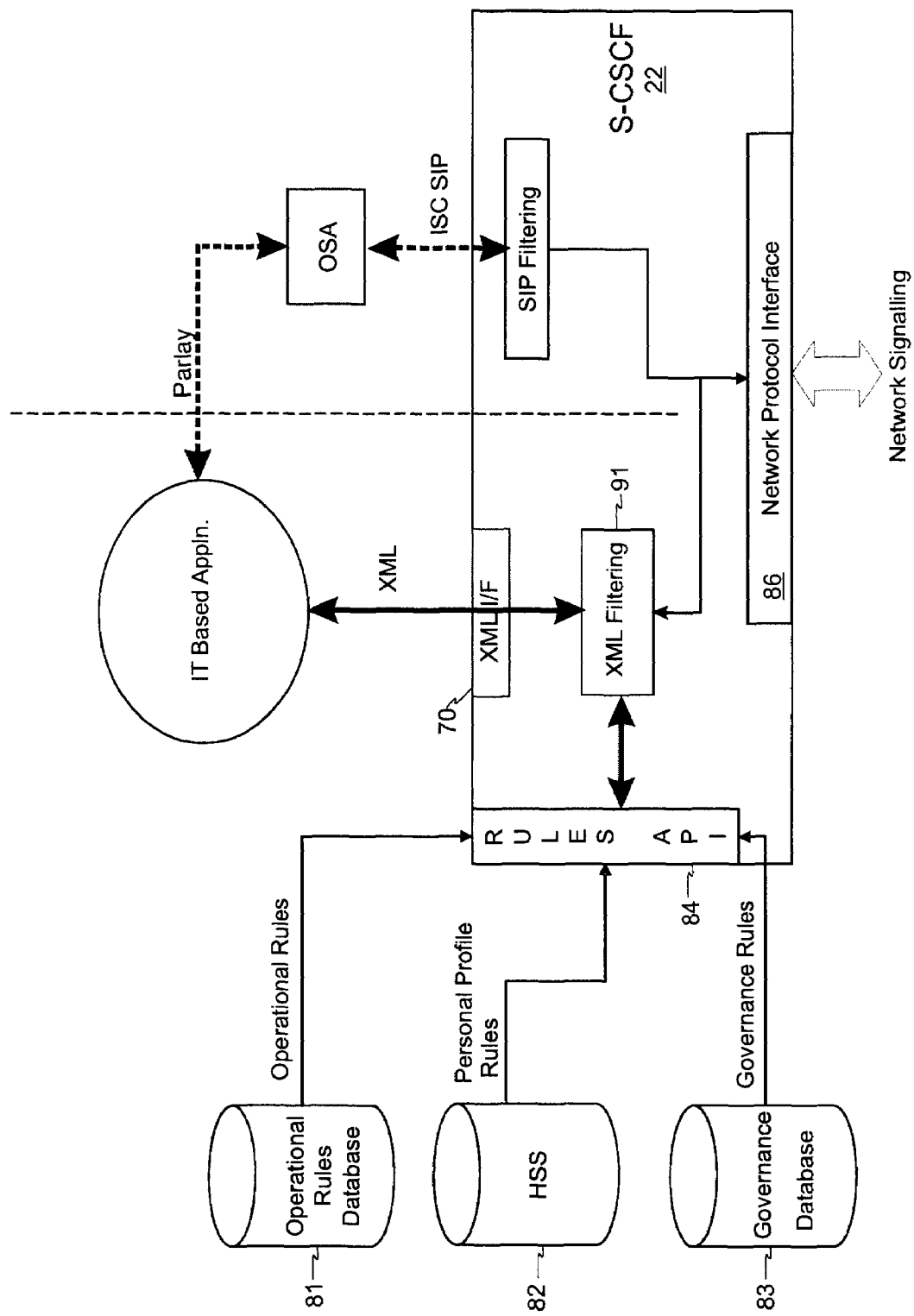
FIG. 3 shows the Call Session Control Function of FIG. 2 in more detail.

FIG. 3 shows the S-CSCF 22 in more detail. The XML interface 70 connects to an XML filtering unit 91. The XML filtering unit 91 inspects signalling data received via the interface and compares information elements within the XML signalling with stored data. The stored data can take the form of rules which indicate what action should be taken in response to receiving a particular information element, or combination of information elements, in the received signalling data. Rules can specify conditions, such as a limit or range that a received information element should take in order for an action to be followed. The S-CSCF accesses rules in a store 80 via a Rules API 84. The filtering process can use rules which include multiple inspection criteria. Alternatively, or additionally, the inspection process can use multiple rules. The filtering unit 91 can also use sets of rules which relate to different parties, such as the operator of the network 20, the subscriber (UE 12), and the provider of the external application 41, 42. The rules used by the XML filtering unit 91 can be stored at the S-CSCF 22, at a centralised database in the IMS network (80, FIG. 2) or at individual databases (81, 82, 83, FIG. 3). Where rules are stored at a database 80 externally of the S-CSCF 22, the S-CSCF 22 can perform a query to the database 80 in real-time. The set, or multiple sets, of stored rules that the XML filter unit 91 uses can be configured and updated as necessary.

The CSCF 22 has a network protocol interface 86 for communicating with other entities within the IMS network. This is typically SIP-based but, in accordance with the present invention, this interface 86 can also send and receive messages in the XML format and forward these to the XML filtering unit 91 for processing.

The XML filtering unit 91 can be used to perform various functions, such as routing, generating charging information and making operational measurements. One function which the control logic 32 can perform is a Charge Triggering Function (CTF). The control logic 32 compares information elements in the received data with stored data (billing triggers) which are indicative of charging events where charging information should be generated. The inspection process uses a set of rules. When received data matches one or more of the stored billing triggers (e.g. a condition specified in a rule) the control logic creates an information flow that captures any relevant information and creates an Accounting Request. The Charge Data Function (CDF) will act on this request to generate a charging record which is typically known as a Charging Data Record (CDR). An output function 33 of the Application Server 30 packages the charging information into the required output format. Preferably, the Accounting Request issued by the Application Server is compliant to the 3GPP Rf interface standard as defined in 3GPP TS 32.260 (3rd Generation Partnership Project; Technical Specification Group Service and System Aspects; Telecommunication management; Charging management; IP Multimedia Subsystem (IMS) charging). 3GPP TS 32.260 also defines how each Accounting Request is acknowledged by an Accounting Answer (ACA).

One example of a rule is a simple instruction for the control logic of the filtering unit 91 to look for a particular information element in the received data, such as a particular subscriber identity (e.g. john@nortel.com). A rule can instruct the control logic to look for a particular information element in the received data and to compare the value with a condition, such as a limit, or a range, which is specified in the rule. As an example, a rule can specify a number of messages that a user is allowed to send at a particular tariff and a tariff for the message (e.g. first ten messages per day free of charge, next ten messages per day at a price of $X per message).

The Accounting Requests 35 are sent to a Charging Data Function (CDF) 50 over an interface 36. The Charging Data Function 50 is a part of the IMS architecture which collates the accounting requests received from the AS, and the accounting requests received from other entities, such as accounting requests 25 received from the S-CSCF 22. The CDF 50 creates a Charging Data Record (CDR) and sends it to a Charging Gateway Function (CGF) 52. The CGF 52 subsequently issues billing information, via an interface 55, to a billing system 56. The billing system will add a charge to a subscriber's account.

Figure 4:
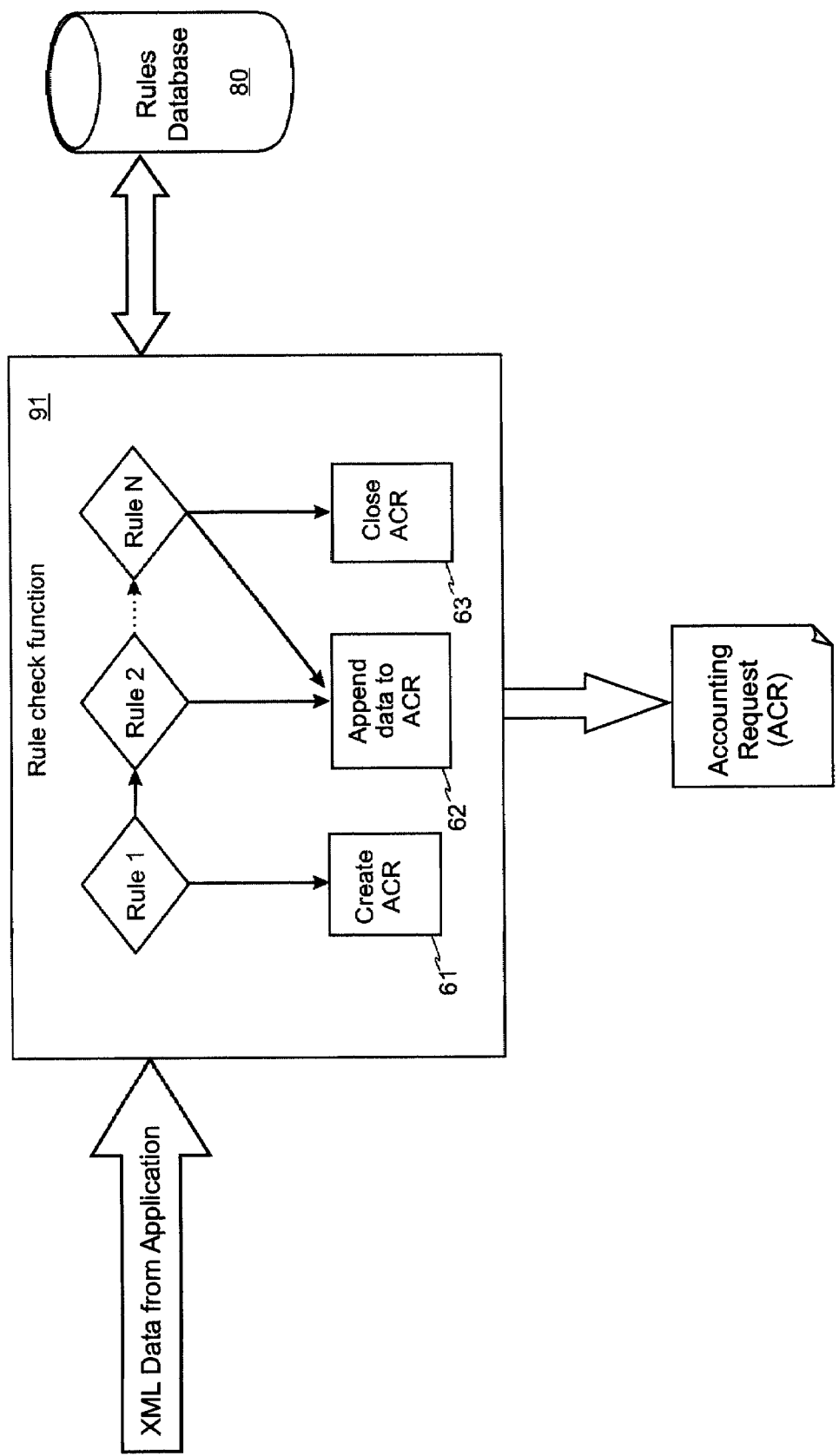
FIG. 4 shows a rule checking function performed by the CSCF of FIG. 3 which collates charging information in a charging data record.

In cases where the comparison process compares the XML data with multiple rules, a separate Accounting Request can be generated on each occasion where a rule instructs the control logic to generate charging information. FIG. 4 schematically illustrates an alternative scheme performed by the filtering unit 91 at a S-CSCF in which the comparison process compares all of the XML data in a particular signalling flow against a set of rules, and issues a single Accounting Request which collates all of the charging information which results from the comparison. This can reduce network signalling overheads and the burden of subsequently processing the multiple Accounting Requests. Application XML data is received by the filtering unit 91. The filtering unit 91 checks the XML data against a set of rules (Rule 1, Rule 2, . . . Rule N) stored in rules database 80. On the first occasion when a comparison of a rule with the XML data results in a match, a create billing record function 61 is invoked. As an example, a rule may state:

```
If (/incomingData@address='john@nortel.com')
{
    billingRecord=new(billingRecord)
}
``` which creates a new Accounting Request based on match between a particular address stated in the rule with the same address appearing in the received XML data. The filtering unit 91 proceeds to compare other rules in the database 80 against the received XML data. On each subsequent occasion when a rule matches the XML data, further data is appended to the Accounting Request by an append data to Accounting Request function 62. A subsequent rule may state, for example:

```
If(/incomingData@applicationRequested='EffectiveCallRoute')
{
    append(billingRecord,EffectiveCallRoute)
}
```

At the end of the rule checking process, the Accounting Request is closed by a close Accounting Request function 63 and the Accounting Request is sent from the S-CSCF via an output interface (86, FIG. 3).

In an online charging scheme, a user has an account which defines an amount of credit and a check is made, in real-time, whether the user has sufficient credit before granting or denying access to a service. In an online charging implementation of the present invention, the S-CSCF 22 inspects incoming XML data and compares elements in the XML data with rules using the filtering unit 91, and then generates a Credit Control Request (CCR) to an Online Charging System (OCS) 54. The CCR is preferably sent via the Ro interface as defined in 3GPP 32.360. The OCS 54 will compare the request with the subscriber's available credit and will reply with a Credit Control Authorisation (CCA) if sufficient credit exists. As the authorised credit is used up, or as stored rules are triggered at the filtering unit 91, further credit control requests may be sent from the filtering unit 91 to the OCS 54. At the end of the session, the filtering unit 91 will inform the OCS 54 to allow it to release any unused credit. The OCS 54 is responsible for keeping the Billing System informed of the usage of credit to allow billing records to be generated.

Figure 5:
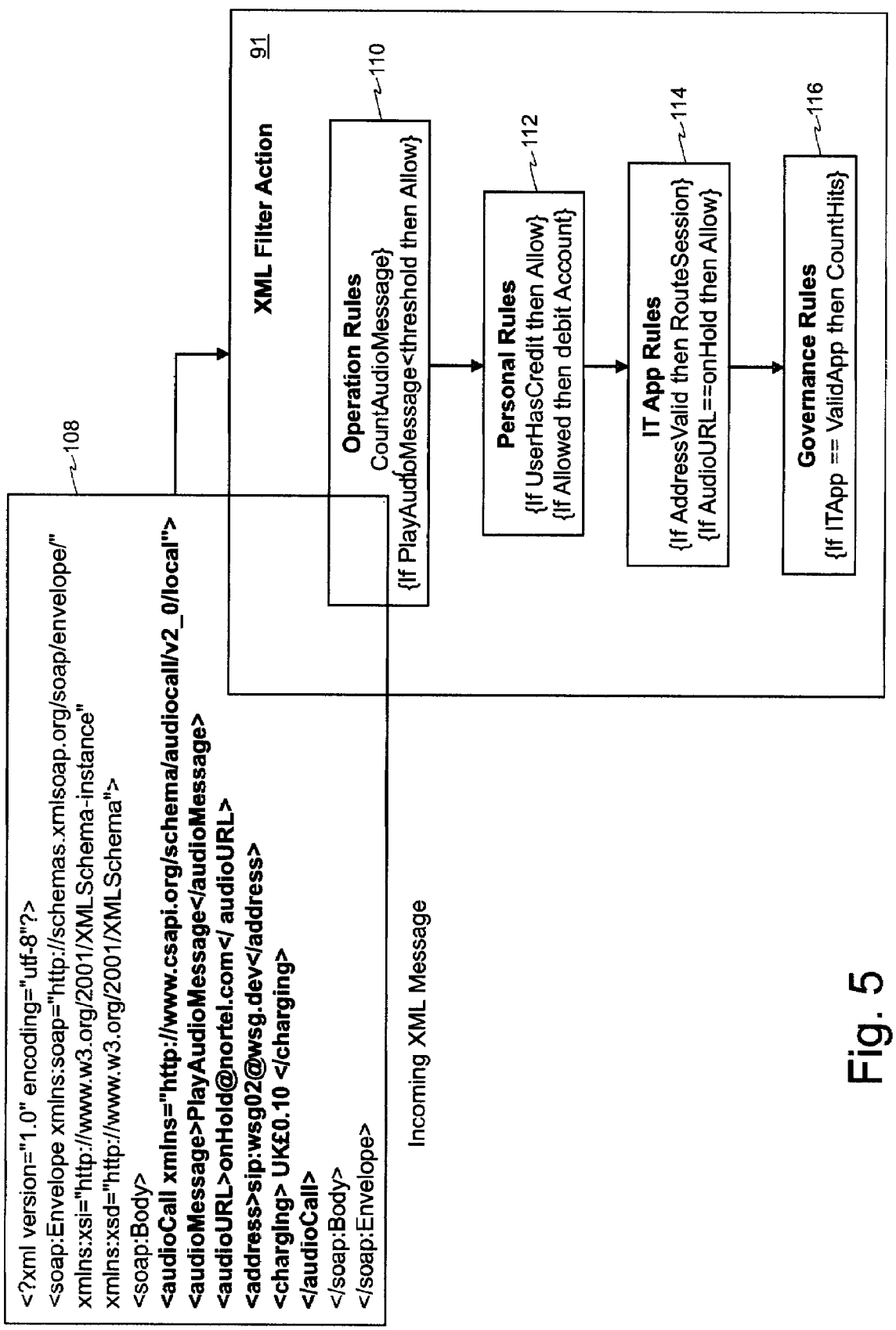
FIG. 5 shows a rule checking function performed by the CSCF of FIG. 3 which uses rules relating to different parties.

FIG. 5 schematically illustrates the inspection and comparison processes performed by XML filtering unit 91, using multiple rule sets. An Application 41 sends a signalling message 108, shown here as XML over SOAP. The message 108 includes instructions to play an audio message, and specifies the location (URL) of the audio server, the destination terminal, and charging information. Application 41 is provided by a party who is independent of the operator of the IMS network 20. The XML filter 91 is shown implementing rules for three separate parties: the IMS network operator; the subscriber and the provider of the external Application. In addition, a set of governance rules govern the compliance of the external application to limits imposed by the operator.

At stage 110, operational rules are checked. In this example, a count is maintained of audio messages and a check is made that the current count value is within a threshold limit. At stage 112 personal rules are checked. This may involve communicating with a Home Subscriber Server (HSS) 104 which maintains details of the subscriber. In this example, the personal rules implement a form of online charging. The signalling message 108 includes charging information for delivering the message. The Personal Rules at step 112 check that the user has sufficient credit in their account to deliver the message, and then debit the account. At stage 114 a set of IT Application Rules are checked. Finally, at stage 116 governance rules are checked. In this example, it checks that the IT Application making use of the IMS network is a valid application, and counts the number of messages that have been delivered. The Governance Rules may impose a maximum number of messages that the IMS network will deliver from that IT Application.

At each of the stages 110, 112, 114, 116 data can be generated as a result of comparing the received XML data with the rules. The data can be sent after that stage has been completed, or the data can be collated as described above. If generated data is destined for different entities (e.g. charging information destined for a charging entity, operational measurements destined for a network management entity) then the generated data can be collated according to which network entity that data is destined.

Figure 6:
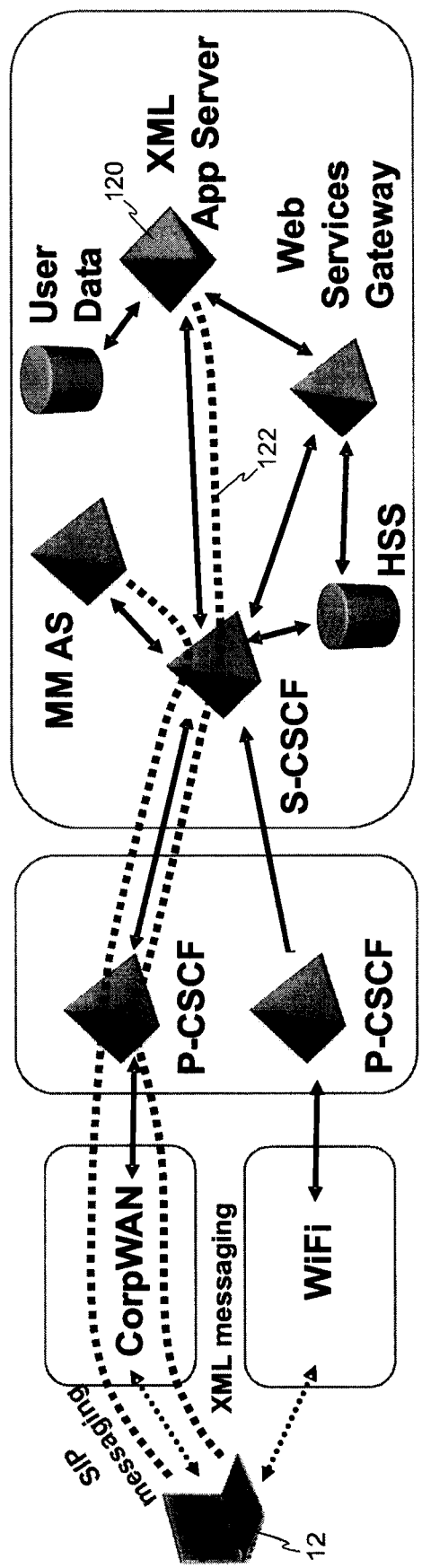
FIG. 6 shows an IMS network which includes an XML Application Server and in which entities can use XML signalling.
Figure 7:
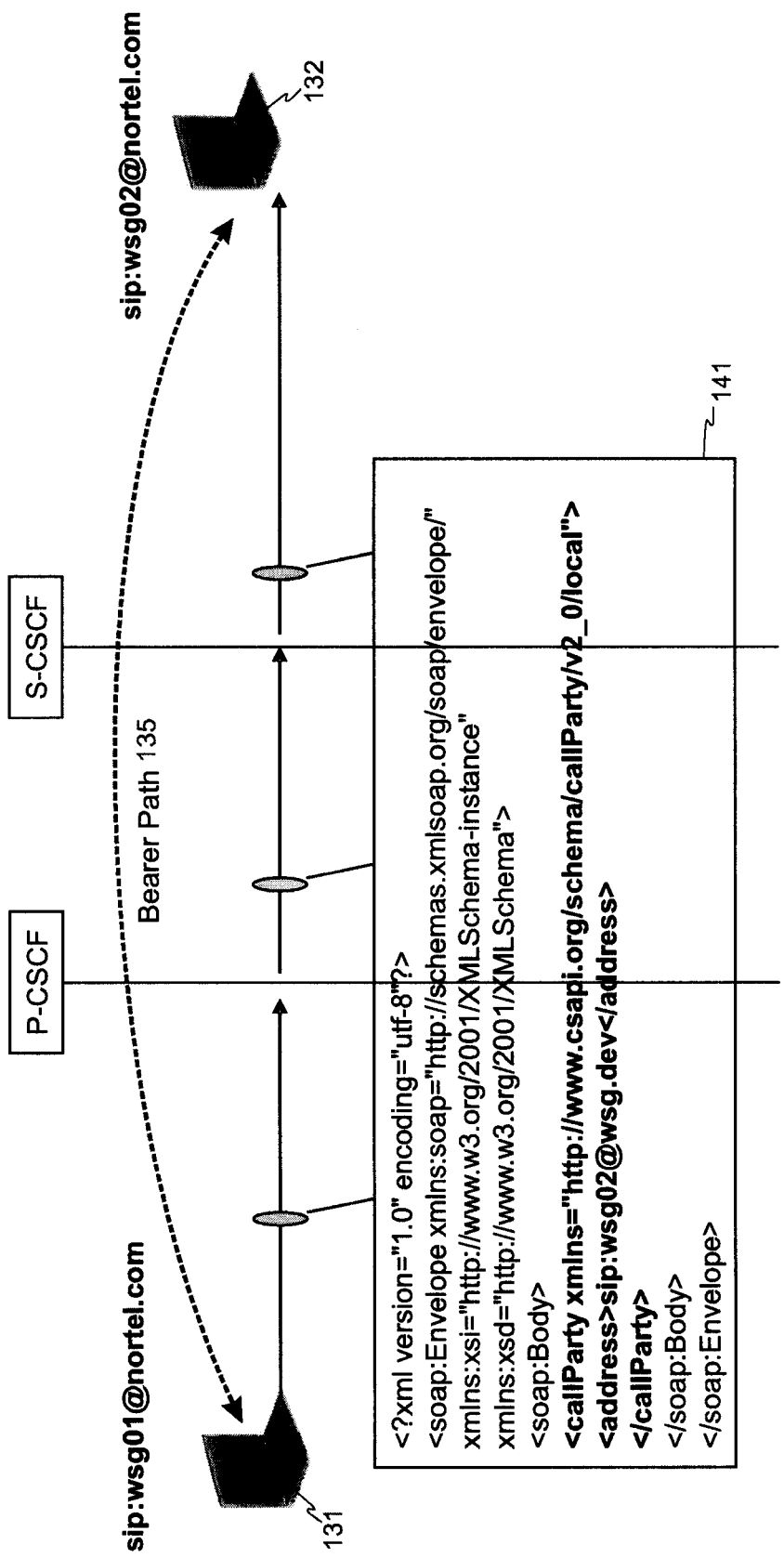
FIG. 7 shows establishing a call between terminals.
Figure 8:
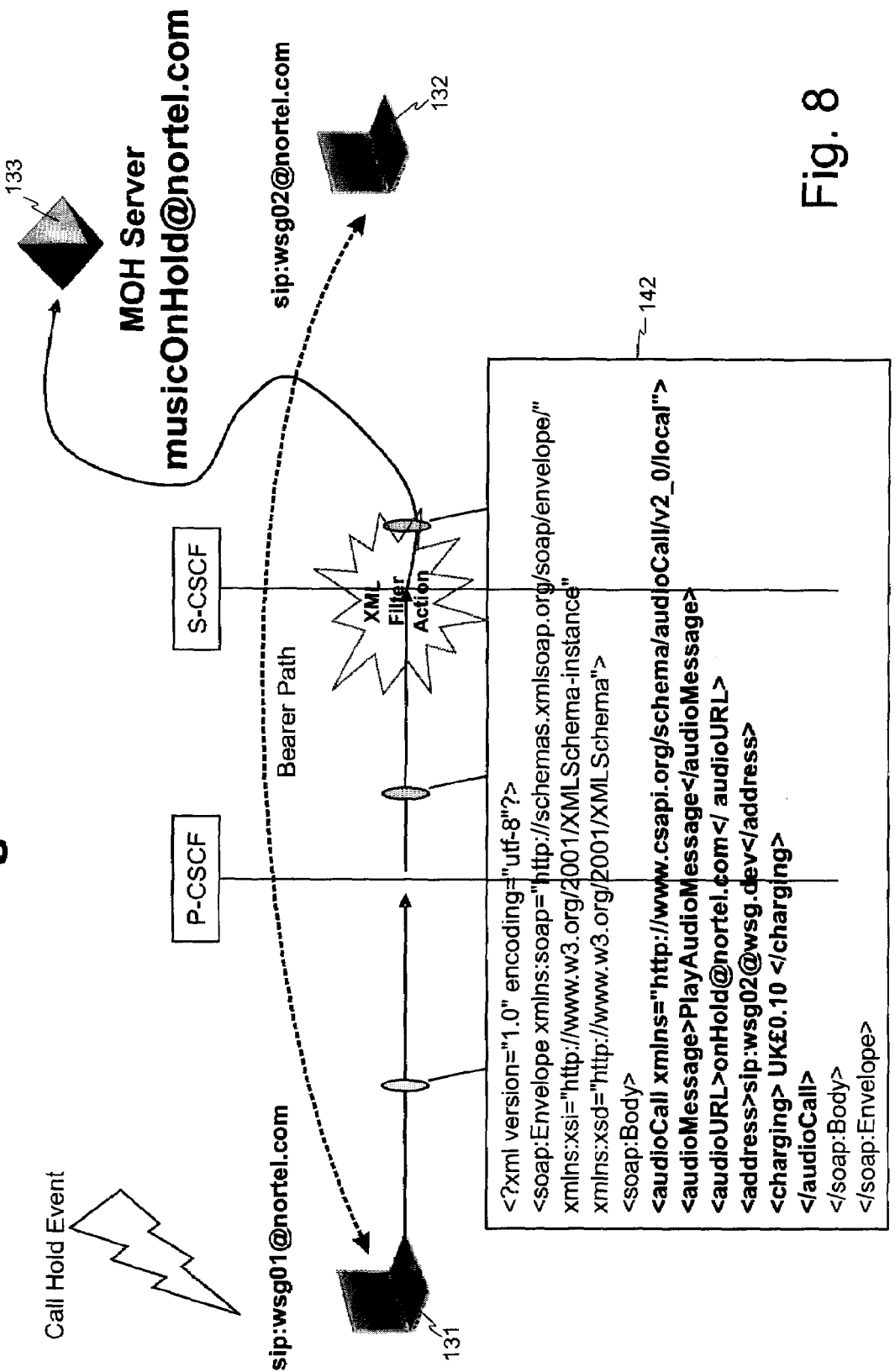
FIGS. 8 and 9 show handling of a call hold event and the use of a music-on-hold server.

FIG. 6 shows another example of an IMS network. This network includes a new entity—an XML Application Server 120. The provision of the XML interface on the S-CSCF allows this new entity to be provided within the network, as XML signalling can now be carried through the IMS network and service requests can be directed to the XML Application Server 120 by the XML filtering action of the S-CSCF. FIG. 6 shows XML signalling between an endpoint terminal 12 and the XML Application Server 120. SIP signalling is also carried by the network, in a conventional manner.

FIGS. 7-10 show a sequence of events which illustrate call set up, and then putting a call on hold. Firstly, a call session is established between terminals 131, 132, resulting in a bearer path 135. This can be achieved using SIP-based signalling, in a known manner, but in FIG. 7 it is achieved using a signalling message 141 which includes XML data. The 'callParty' XML fragment is used to indicate that this message is the command and it is used to effect a new session and uses the address information contained within the fragment as the destination.

Figure 9:
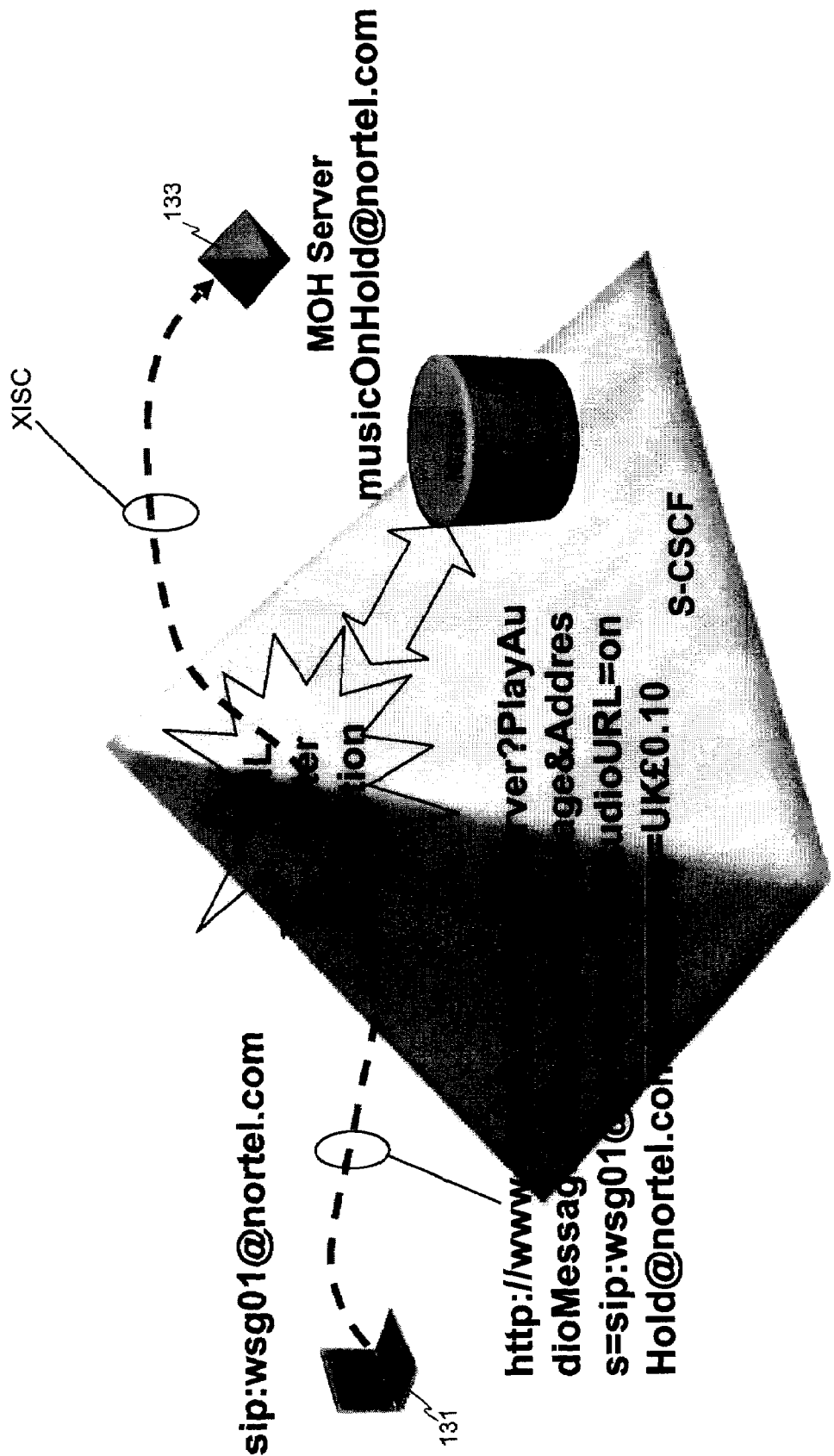
Figure 10:
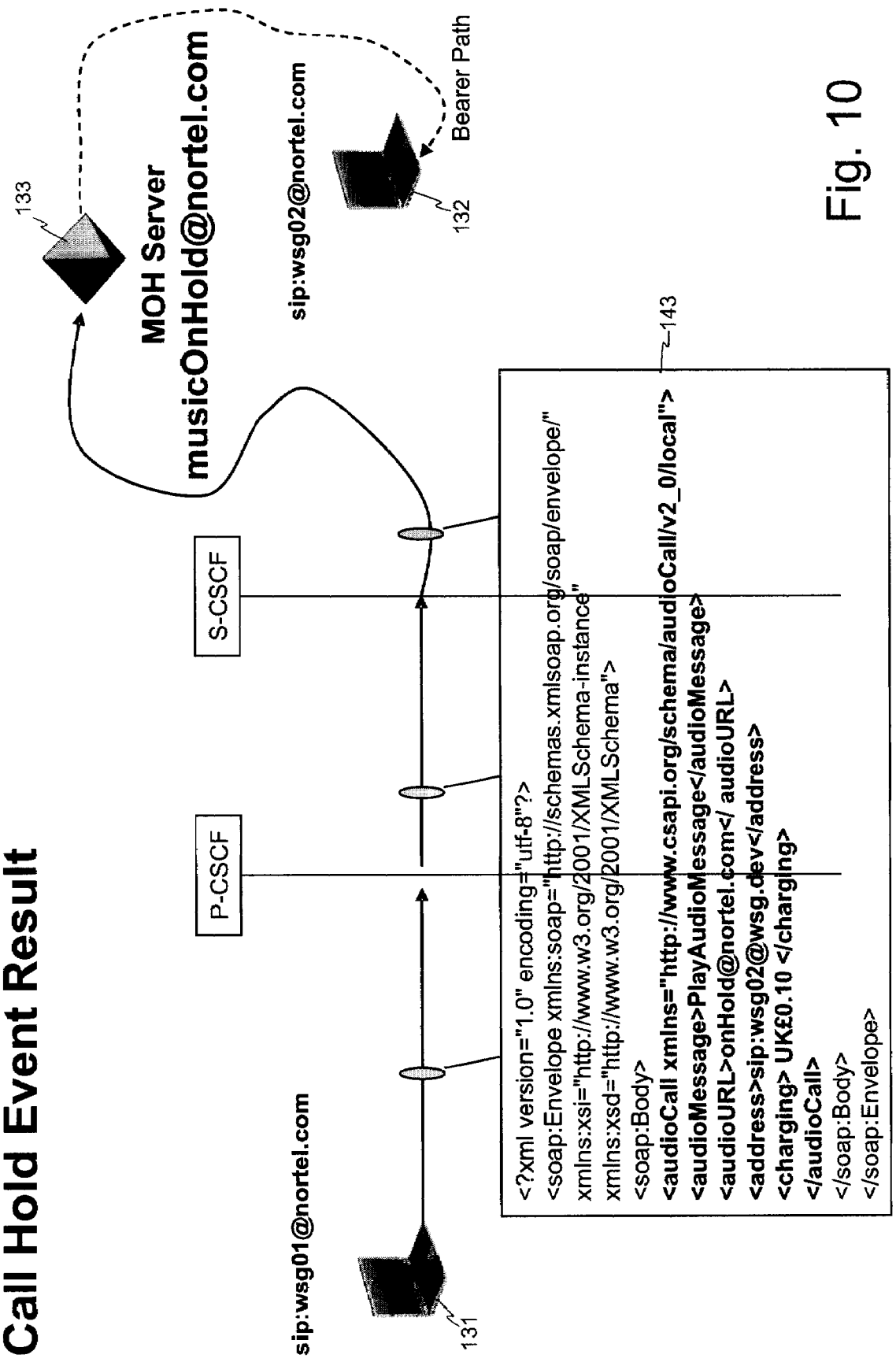
FIG. 10 shows the result of the call hold event of FIGS. 8 and 9.

At some later point during the call session terminal 131 initiates a call hold event. Terminal 131 issues a message 142 instructing a music-on-hold server 133 to play music on hold to terminal 132. Message 142 includes XML data which carries an instruction to play an audio message, the address of the server which should play the music during the call hold event and charging information. As shown in FIG. 9, the XML signalling message is received by the S-CSCF. XML filtering unit 91 within the S-CSCF receives the message 142 and compares the message with the rules in the rules database. After performing the rules check, the XML signalling message is forwarded to the music-on-hold server 133. As described in the examples previously, the rules check can result in charging information being generated by the S-CSCF. In this example, it is assumed that the rules allow the XML message to be forwarded to the music-on-hold server 133. The music-on-hold server 133 establishes a bearer path with terminal 132 and begins to play music-on-hold, as shown in FIG. 10.

The invention described above is not limited to providing services to wireless subscribers. Any form of access network (wireless, wireline or combination of these) can be used to connect a user equipment to the IMS network.

The invention is not limited to the embodiments described herein, which may be modified or varied without departing from the scope of the invention.

We claim:

1. A Call Session Control Function (CSCF) hardware server comprising a Serving Call Session Control Function (S-CSCF) operable in an IP Multimedia Subsystem (IMS) network, the CSCF hardware server further comprising:
   a first interface of the S-CSCF configured to interface directly with at least one first network entity application for provisioning of one or more services using signaling in an Extensible Markup Language (XML) format; and
   a second interface of the S-CSCF, separate from the first interface, configured to interface with at least one second network entity using Session Initiation Protocol (SIP) signaling,
   wherein the CSCF hardware server is configured to communicate within or external to the IMS network by selectively using the first and second interfaces.

2. A Call Session Control Function (CSCF) hardware server according to claim 1 comprising control logic arranged to:
   receive XML signaling information from the application via the first interface; and,
   use the XML signaling information to apply the application within the IMS network.

3. A Call Session Control Function (CSCF) hardware server according to claim 1 comprising control logic arranged to:
   send XML signaling information to the application via the first interface; and,
   use the XML signaling information to control the application.

4. A Call Session Control Function (CSCF) hardware server according to claim 1 wherein the application is hosted external to the IMS network.

5. A Call Session Control Function (CSCF) hardware server according to claim 4 wherein the application is a web service.

6. A Call Session Control Function (CSCF) hardware server according to claim 1 further comprising control logic arranged to:
   inspect XML signaling information received via the first interface;
   compare the received signaling information with stored rule data which specifies a relationship between an element in the signaling information and an action that should be taken; and,
   generating output data on the basis of the comparison.

7. A Call Session Control Function (CSCF) hardware server according to claim 6 further comprising an interface for accessing the stored rule data.

8. A Call Session Control Function (CSCF) hardware server according to claim 5 wherein the rule data specifies when charging information should be generated and wherein the control logic is arranged to generate charging information based on the comparison.

9. A Call Session Control Function (CSCF) hardware server according to claim 5 wherein the rule data comprises at least one of: rules of the network operator; rules for a subscriber; and rules for governance of an application.

10. A method of operating a Call Session Control Function (CSCF) entity, comprising a Serving Call Session Control Function (S-CSCF), in an IP Multimedia Subsystem (IMS) network, the method comprising:
    communicating within or external to the IMS network by selectively using a first interface of the S-CSCF and a second interface of the S-CSCF in the CSCF entity, wherein the first interface is configured to directly interface with at least one network entity application for provisioning of one or more services using Extensible Markup Language (XML) signaling, and wherein the second interface is configured to interface with at least on second network entity using Session Initiation Protocol (SIP) signaling.

11. A method according to claim 10 wherein the application is hosted on an application server.

12. A method according to claim 11 wherein the application is hosted externally of the IMS network.

13. A method according to claim 11 comprising:
    receiving XML signaling information from the application via the first interface; and,
    using the XML signaling information to apply the application within the IMS network.

14. A method according to claim 11 comprising:
    sending XML signaling information to the application via the first interface; and,
    using the XML signaling information to control the application.

15. A method according to claim 11 wherein the application is a web service.

16. A method according to claim 14 wherein the rule data specifies when charging information should be generated and the method comprises generating charging information based on the comparison.

17. A method according to claim 14 wherein the rule data comprises at least one of: rules of the network operator; rules for a subscriber; and rules for governance of an application.

18. A non-transitory, machine-readable medium carrying instructions for causing a processor to implement the method of claim 10.

* * * * *